(12) United States Patent
Bhuruth et al.

(10) Patent No.: US 10,255,690 B2
(45) Date of Patent: Apr. 9, 2019

(54) SYSTEM AND METHOD TO MODIFY DISPLAY OF AUGMENTED REALITY CONTENT

(71) Applicant: CANON KABUSHIKI KAISHA, Tokyo (JP)

(72) Inventors: Berty Jacques Alain Bhuruth, Bankstown (AU); Belinda Margaret Yee, Balmain (AU); Julie Rae Kowald, Dundas Valley (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/385,532

(22) Filed: Dec. 20, 2016

(65) Prior Publication Data
US 2017/0178356 A1 Jun. 22, 2017

(30) Foreign Application Priority Data
Dec. 22, 2015 (AU) .................................. 2015275252

(51) Int. Cl.
*G06T 7/73* (2017.01)
*G06F 3/01* (2006.01)
(Continued)

(52) U.S. Cl.
CPC ............... *G06T 7/73* (2017.01); *G06F 3/013* (2013.01); *G06T 3/20* (2013.01); *G06T 11/00* (2013.01);
(Continued)

(58) Field of Classification Search
CPC .......... G06F 3/011; G06F 3/012; G06F 3/013; G06F 3/017; G06T 19/006; G06T 7/73; G06T 2207/30201; H04N 2201/3245
See application file for complete search history.

(56) References Cited

U.S. PATENT DOCUMENTS

| 2014/0096084 A1* | 4/2014 | Kwon .................. G06F 3/0482 715/835 |
| 2014/0146394 A1* | 5/2014 | Tout ...................... G09B 9/307 359/630 |

(Continued)

OTHER PUBLICATIONS

Jason Orlosky, Kiyoshi Kiyokawa, Takumi Toyama, Daniel Sonntag, Halo Content: Context-aware View Management for Non-invasive Augmented Reality, IUI '15 Proceedings of the 20th International Conference on Intelligent User Interfaces, Mar. 29, 2015, pp. 369-373, Association for Computing Machinery, New York, NY, Mar. 29, 2015.

(Continued)

*Primary Examiner* — Antonio A Caschera
(74) *Attorney, Agent, or Firm* — Canon U.S.A., Inc. IP Division

(57) ABSTRACT

A system and head-mounted device modify display of augmented reality content during an interaction between a person and a user of a mixed reality system. The method comprises detecting an interaction between a person and a user of a mixed reality system, the mixed reality system displaying the augmented reality content to the user, the interaction being detectable by the mixed reality system when a gaze interaction of the person is detected as directed towards the user and accordingly a sensor of the mixed reality system; determining an urgency of the interaction according to further interaction between the person and the user; determining that an element of the display of the augmented reality content is obscuring the interaction; selecting a transition effect for modifying display of the element from a plurality of transition effects according to the determined urgency of the interaction, and modifying the display of the element according to the selected transition effect.

22 Claims, 9 Drawing Sheets

(51) Int. Cl.
  *G06T 3/20*   (2006.01)
  *G06T 11/00*  (2006.01)
  *G06T 13/00*  (2011.01)
  *G06T 19/00*  (2011.01)
  *G06F 3/16*   (2006.01)
  *G06T 3/40*   (2006.01)
  *G06T 3/60*   (2006.01)

(52) U.S. Cl.
  CPC ............ *G06T 13/00* (2013.01); *G06T 19/006* (2013.01); *G06F 3/017* (2013.01); *G06F 3/16* (2013.01); *G06T 3/40* (2013.01); *G06T 3/60* (2013.01); *G06T 2207/30201* (2013.01); *G06T 2210/62* (2013.01)

(56) References Cited

U.S. PATENT DOCUMENTS

2014/0364212 A1    12/2014  Osman et al.
2016/0307361 A1*   10/2016  Shionozaki ........... G06T 15/503

OTHER PUBLICATIONS

Takumi Toyama, Daniel Sonntag, Jason Orlosky, Kiyoshi Kiyokawa, Attention Engagement and Cognitive State Analysis for Augmented Reality Text Display Functions, IUI '15 Proceedings of the 20th International Conference on Intelligent User Interfaces, Mar. 29, 2015, pp. 322-332, Association for Computing Machinery, New York, NY, Mar. 29, 2015.

Dan Witzner Hansen, Arthur E.C. Pece, Eye Tracking in the Wild, Computer Vision and Image Understanding, 2005, 98(1):155-181, Elsevier B.V., Amsterdam, NL, 2005.

M. A. Moni, A. B. M. Shawkat Ali, HMM based Hand Gesture Recognition: A Review on Techniques and Approaches, 2009 2nd IEEE International Conference on Computer Science and Information Technology, 2009, pp. 133-437, IEEE, Piscatawy, NY, 2009.

George E. Dahl, Dong Yu, Li Deng, Alex Acero, Context-Dependent Pre-Trained Deep Neural Networks for Large-Vocabulary Speech Recognition, IEEE Transactions on Audio, Speech, and Language Processing, 2011, 20(1): 30-42, IEEE, Piscatawy, NY, 2011.

Paul Viola, Michael Jones, Rapid Object detection using a Boosted Cascade of Simple Features, Authors Manuscript, 2001.

* cited by examiner

SYSTEM AND METHOD TO MODIFY DISPLAY OF AUGMENTED REALITY CONTENT

REFERENCE TO RELATED PATENT APPLICATION(S)

This application claims the benefit under 35 U.S.C. § 119 of the filing date of Australian Patent Application No. 2015275252, filed 22 Dec. 2015, hereby incorporated by reference in its entirety as if fully set forth herein.

TECHNICAL FIELD

The present invention relates to augmented reality and in particular, the modification of display of augmented reality content as viewed by a user. The arrangements described also relate to mixed reality. This invention also relates to a method of detecting interaction between a person and a user to determine how display of the augmented reality content is modified.

BACKGROUND

Augmented reality systems allow a user to view augmented content spatially positioned in their physical environment. The very nature of augmented reality and how augmented reality is delivered means that the augmented content is private to the user. People who are not wearing an augmented reality device or viewing through an augmented reality device cannot see the spatial position of an augmented reality system user's augmented content. Additionally, users of an augmented reality device may use an exclusive augmented reality environment. In an exclusive augmented reality environment a user only has access to the user's own augmented reality content and have limited to zero access to other user's environments.

An issue arises when people communicate with users operating in an augmented reality environment. Since the communicating people are unaware of the spatial position of the user's augmented reality content, the communicating people may unwittingly position themselves behind the augmented reality content. As a result, a user operating in an augmented reality environment may not see the person who is trying to communicate and inadvertently not acknowledge the person. From the point of view of the person trying to communicate, the impression of the user in the augmented reality environment could be that of being rude and ignoring attempts to communicate.

One method of addressing the problems described above uses face detection to detect faces of people communicating with an augmented reality user, and then moves elements of the augmented reality content so as not to interfere with interpersonal interactions. Specifically the method moves the augmented reality content in an up and outwardly direction, away from the bottom centre of the frame when a face is detected. The method moves the augmented reality content in this direction because when faces are in frame their body usually occupies the bottom of the frame. A limitation of such methods is that such may produce an undesirable result in the real world. For example, in the scenario of a user in a crowded environment, such as public transport, there may be instances where faces are detected but without the intention to interact with the user. This would unnecessarily modify the user's augmented reality content by repositioning the content higher in the frame; affecting the user experience.

Another method of addressing the problem described above changes a transparency mode of a display by detecting a gaze direction of the user, then capturing images of the real world to integrate with the rendered image. Such a method relies on the user first acknowledging that there is someone to communicate with in order for the user to want to change their gaze direction. Additionally, the decision to modify the transparency affects the legibility of the augmentation. This results in an undesirable experience for the augmented reality user.

SUMMARY

It is an object of the present invention to substantially overcome, or at least ameliorate, at least one disadvantage of existing arrangements.

A first aspect of the present disclosure provides a computer-implemented method of modifying display of augmented reality content, the method comprising: detecting an interaction between a person and a user of a mixed reality system, the mixed reality system displaying the augmented reality content to the user, the interaction being detectable by the mixed reality system when a gaze interaction of the person is detected as directed towards the user and accordingly a sensor of the mixed reality system; determining an urgency of the interaction according to further interaction between the person and the user; determining that an element of the display of the augmented reality content is obscuring the interaction; selecting a transition effect for modifying display of the element from a plurality of transition effects according to the determined urgency of the interaction, and modifying the display of the element according to the selected transition effect.

According to another aspect of the present disclosure, the transition effect is selected based on a speed at which a visibility of the person to the user is to be varied.

According to another aspect of the present disclosure, the second interaction is a non-gaze interaction.

According to another aspect of the present disclosure, the element of the augmented reality content is determined to obscure the interaction comprises determining that the element is positioned in an area between the person and a view of the user.

According to another aspect of the present disclosure, the area relates to a face of the person.

According to another aspect of the present disclosure, the area relates to any portion of a body of the person detectable by the sensor.

According to another aspect of the present disclosure, the area relates to a face of the person and an area below the face of the person.

According to another aspect of the present disclosure, the area relates to one or more further persons associated with the person, each of the one or more further persons being associated with the person based upon a proximity to the person.

According to another aspect of the present disclosure, the further interaction comprises one of a gaze interaction, a speech interaction and a gesture interaction.

According to another aspect of the present disclosure, the interaction is determined have a high level of urgency if the further interaction is detected in a time less than a first threshold from the first interaction.

According to another aspect of the present disclosure, the interaction is determined to have a low level of urgency if the further interaction is detected in a time greater than a second threshold from the first interaction.

According to another aspect of the present disclosure, the interaction is determined to have a medium level of urgency if the further interaction is detected in a time between the first threshold and the second threshold.

According to another aspect of the present disclosure, the selected transition effect relates to modifying transparency of the element if the determined urgency is below a first predetermined threshold.

According to another aspect of the present disclosure, the selected transition effect relates to modifying positioning of the element if the determined urgency is above a second predetermined threshold.

According to another aspect of the present disclosure, the selected transition effect relates to modifying both transparency and positioning of the element if the determined urgency is between first and second thresholds.

According to another aspect of the present disclosure, the transparency and the positioning of the element are modified according to a ratio based upon occurrence of the further interaction relative to the first and second thresholds.

According to another aspect of the present disclosure, the transition effect comprises at least one of modifying rotation, scaling, information, colour and text characteristics of the element.

A further aspect of the present disclosure provides a mixed reality system, configured to: display augmented reality content to a user of the mixed reality system; detect an interaction between a person and the user, the interaction being detectable by the mixed reality system when a gaze interaction of the person is detected as directed towards the user and accordingly a sensor of the mixed reality system; determine an urgency of the interaction according to further interaction between the person and the user; determine that an element of the display of the augmented reality content is obscuring the interaction; select a transition effect for modifying display of the element from a plurality of transition effects according to the determined urgency of the interaction, and modify the display of the element according to the selected transition effect.

A further aspect of the present disclosure provides a non-transitory computer readable storage medium having a computer program stored thereon for modifying display of augmented reality content, comprising: code for detecting an interaction between a person and a user of a mixed reality system, the mixed reality system displaying the augmented reality content to the user, the interaction being detectable by the mixed reality system when a gaze interaction of the person is detected as directed towards the user and accordingly a camera of the mixed reality system; code for determining an urgency of the interaction according to further interaction between the person and the user, the further interaction being non-gaze interaction; code for determining that an element of the display of the augmented reality content is obscuring the interaction when the element is positioned between the person and a view of the user; code for selecting a transition effect for modifying display of the element from a plurality of transition effects according to the determined urgency of the interaction, the selected transition effect being selected based on a speed at which a visibility of the person to the user is varied; and code for modifying the display of the element according to the selected transition effect.

A further aspect of the present disclosure provides a head mountable display, comprising: camera, a processor, and a memory, the memory having instructions thereon executable by the processor to: display a mixed reality environment to a user of the head mounted device, and modify display of augmented reality content in the mixed reality environment, by: detecting an interaction between a person and the user of the head mounted apparatus, the interaction being detectable when a gaze interaction of the person is detected as directed towards the user and accordingly the camera; determining an urgency of the interaction according to further interaction between the person and the user, the further interaction being non-gaze interaction; determining that an element of the display of the augmented reality content is obscuring the interaction when the element is positioned between the person and a view of the user; selecting a transition effect for modifying the display of the element from a plurality of transition effects according to the determined urgency of the interaction, the selected transition effect being selected based on a speed at which a visibility of the person to the user is varied; and modifying the display of the element according to the selected transition effect.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
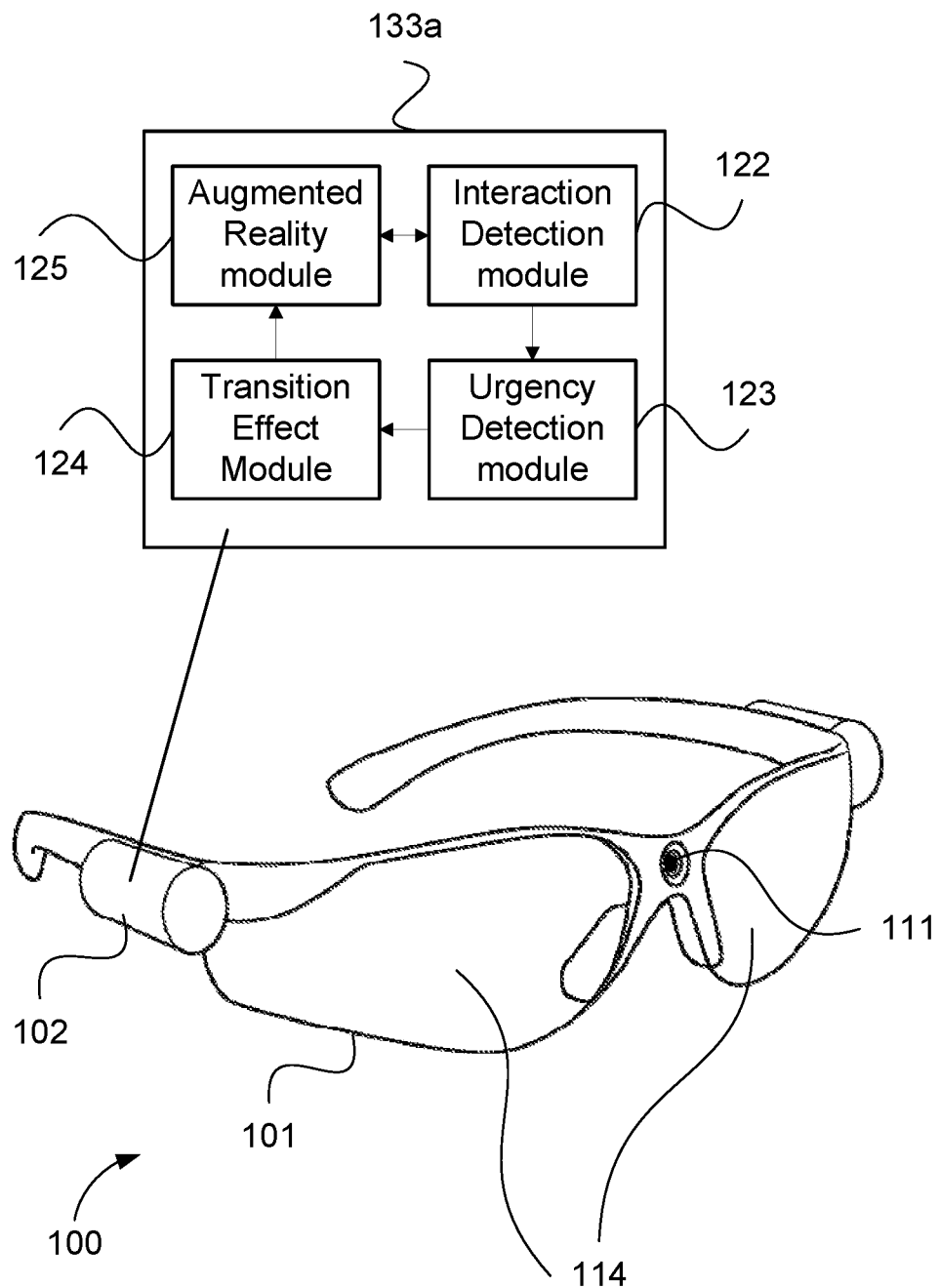
FIGS. 1A, 1B and 1C collectively form a schematic block diagram representation of an electronic device upon which described arrangements can be practised.

Where reference is made in any one or more of the accompanying drawings to steps and/or features, which have the same reference numerals, those steps and/or features have for the purposes of this description the same function (s) or operation(s), unless the contrary intention appears.

An augmented reality system that modifies augmented content is described. The arrangements described allow efficient communication between a person and a user of the augmented reality system.

As described above, augmented reality refers to presentation of a live view of a physical real-world scene along with additional computer-generated images superimposed on the live view. The computer-generated images commonly represent one or more virtual objects. The virtual objects are not tangible, and are only visible through the view of the augmented reality.

FIG. 1A shows an augmented reality system 100 according to one example arrangement. The system 100 comprises an electronic device 101. In the example of FIG. 1A, the electronic device comprises a head mounted display. The head mounted display 101, also referred to as a head mountable display, includes a camera 111 that captures an image of the real world scene, a pair of lenses which collectively form a display 114 upon which to display the augmented content (also referred to as augmented reality content) in front of the real world for viewing by a user. The head mounted display 101 also includes a central processing unit (CPU) 102, also referred to as an embedded controller. Although, the camera 111, display 114 and CPU 102 are shown to be integrated into single electronic device configuration 101, the camera 111, display 114 and CPU 102 could be configured into other arrangements suitable for performing the described methods. Further, one or more steps of the methods to be described may also be performed on higher-level devices such as desktop computers, server computers, and other such devices with significantly larger processing resources than the electronic device 101, which may have relatively limited processing resources.

The camera 111 may be any image capture device suitable for integration with an electronic device, such as a still camera, a video camera and the like. The camera 111 may in some arrangements be configured to include a microphone (not shown) for recording sound. The camera 111 effectively forms a sensor for detecting presence and interaction of a person.

Figure 1B:
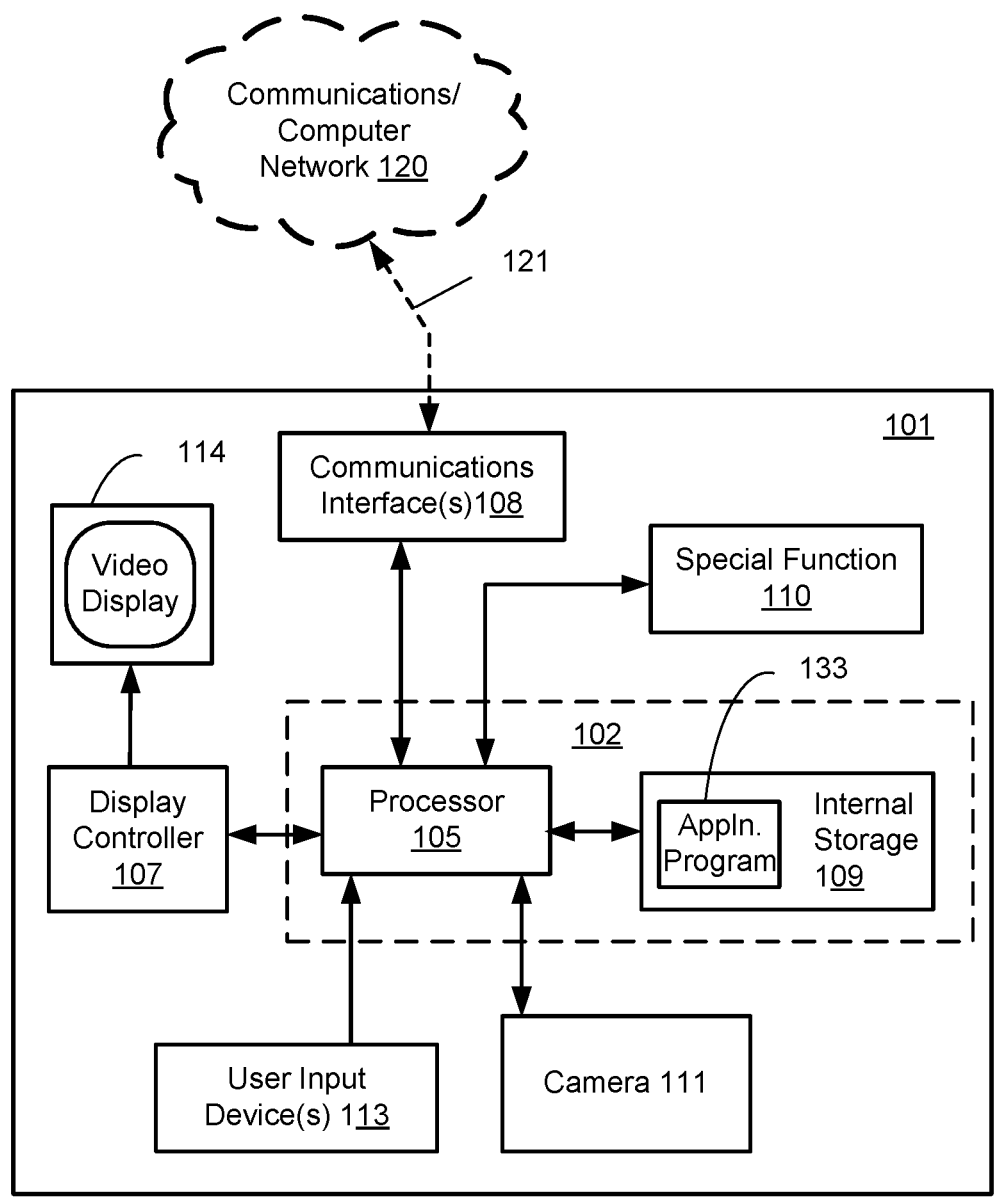
Figure 1C:
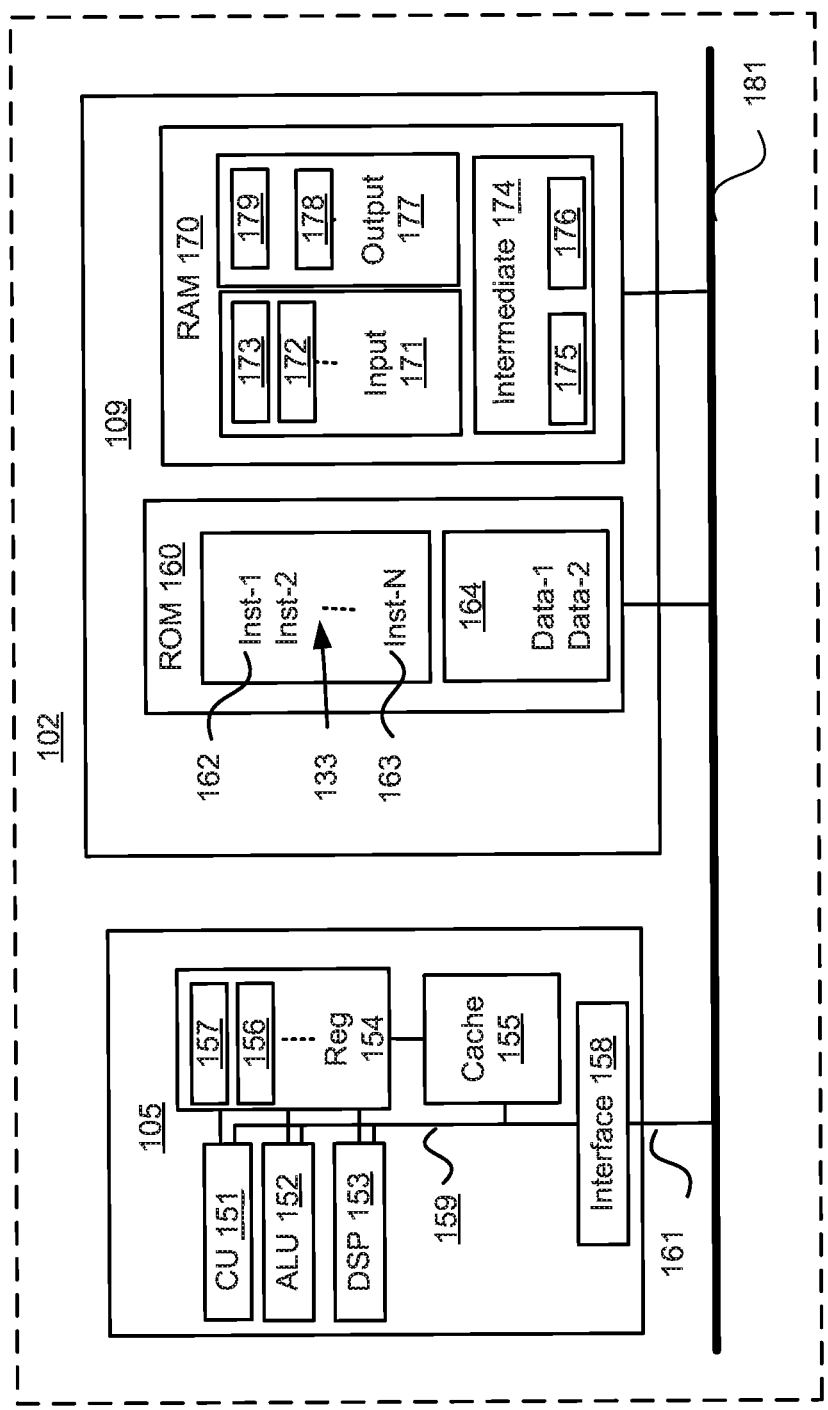

FIGS. 1B and 1C collectively form a schematic block diagram of a general purpose electronic device 101 including embedded components, upon which the methods to be described are desirably practiced. The electronic device 101 relates to a head mountable display in the arrangements described. However, in other implementations, the device 101 may be any type of personal electronics device capable of creating an augmented reality environment and in which processing resources are limited. Nevertheless, the methods to be described may also be performed on higher-level devices such as desktop computers, server computers, and other such devices with significantly larger processing resources.

As seen in FIG. 1B, the electronic device 101 comprises the embedded controller 102. Accordingly, the electronic device 101 may be referred to as an "embedded device." In the example of FIG. 1B, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1C. The RAM 170 may be volatile, non-volatile or a combination of volatile and non-volatile memory.

The electronic device 101 includes a display controller 107, which is connected to a video display 114. In the example of FIGS. 1A to 1C, the display relates to the pair of lenses upon which augmented reality is projected. The display controller 107 is configured for displaying graphical images, including augmented reality content on the video display 114 in accordance with instructions received from the embedded controller 102, to which the display controller 107 is connected.

The electronic device 101 also includes user input devices 113 which are typically formed by a microphone (not shown) for detecting voice commands of a user of the device 101, and in some arrangements, a touch-pad. The electronic device may also receive input via network communications, as described below.

The electronic device 101 also has a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 101 is configured to perform some special function. The embedded controller 102, possibly in conjunction with further special function components 110, is provided to perform that special function. For example, where the device 101 is head mounted projection device, the components 110 may represent the camera 111 (including a lens, focus control and image sensor of the camera 111). The special function components may also include a projection device (not shown) for projecting augmented reality content onto the lens display 114. The special function components 110 is connected to the embedded controller 102.

The methods described hereinafter may be implemented using the embedded controller 102, where the processes of FIGS. 2, 3 and 5 may be implemented as one or more software application programs 133 executable within the embedded controller 102. The electronic device 101 of FIG. 1B implements the described methods. In particular, with reference to FIG. 1C, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via a portable memory interface (not shown) prior to storage in the internal storage module 109. In another alternative, the software application program 133 may be read by the processor 105 from the network 120, or loaded into the controller 102 or a portable storage medium (not shown) from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of transitory or non-tangible computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1B. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via a microphone (not illustrated).

FIG. 1C illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the electronic device 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152, a digital signal processor (DSP) 153 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 though 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 waits for events and subsequently executes the block of code associated with that event. Events may be triggered in response to input from a user, via the user input devices 113 of FIG. 1B, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101.

The embedded controller 102 displays augmented reality content to the user by projecting the augmented reality content onto the display 114. The display 114, formed by the pair of lenses, may be transparent when augmented reality content is not being displayed so that the user can view the surrounding environment. Portions of the display 114 may be at least partially transparent when the augmented reality content is being displayed to the user. The augmented reality content may accordingly be projected onto the display 114 such that the user can view the surrounding environment through portions of the display 114 upon which augmented reality is not projected, creating a mixed reality environment. As the user can view both augmented reality content and the user's actual surrounding environment simultaneously, the electronic device 101 of the system 100 effectively forms a mixed reality system.

In the arrangements described, the "user" relates to a user of the electronic device 101, that is a person wearing the head mounted device 101 and viewing augmented reality content via the lens display 114. In the description below, a "person" relates to another person who is not wearing the electronic device 101. The person is in the presence of the user and typically wants to communicate with the user.

The arrangements described herein relate to a method of selecting a transition effect to modify augmented reality content that is obscuring the user's view of a person interacting with the user. The transition effect is selected by determining the urgency of the interaction and how the transition effect's suitability relates to the urgency. The system 100 described has a first priority when the urgency is high. When the urgency is determined to be high, the first priority of the system 100 is, if required, to provide a clear view of the person utilising a first transition effect (referred to hereafter as transition effect 1) regardless of content legibility of the augmented reality content. However if suitable, that is if the determined urgency is low, the system 100 will utilise a second transition effect (referred to as transition effect 2), which maintains content legibility in addition to providing a clear view of the person. In cases where the determined urgency is between high and low levels, a combination of transition effect 1 and 2 will be utilised. A by-product of determining the urgency is the method determines an intent of the person to interact with the user. In this regard, the arrangements described are intended to overcome other methods that respond to presence of a person in relation the user without intent to communicate with the user.

The arrangements described relate to a user wearing the augmented reality head mounted device 101. In addition to the head mounted device 101, the user may be wearing headphones which further reduce the user's comprehension of an environment surrounding the user. As the person approaches the user, the camera 111 captures an image of the person.

FIG. 1A shows a software architecture 133a executable on the central processing unit 102. The software architecture typically forms one or more modules of the application 133. Augmented reality content is displayed by execution of an augmented reality module 125 of the architecture 133a.

An interaction detection module 122 of the architecture 133a receives audio visual information to detect an interaction. The audio visual information is captured from the camera 111. In the context of the arrangements described, an interaction includes both gaze and non-gaze interaction of the person. Gaze interaction relates to detecting the eyes of the person interacting with the user in a scene captured by the camera 111 and further detecting a direction in which the person is looking. Non-gaze interaction includes at least gesture, posture and speech of the interacting person. The interaction detection module 122 communicates with the augmented reality module 125 to determine a position of augmented content with respect to a view of the user. The interaction detection module 122 with an urgency detection module 123 to pass interaction data.

The urgency detection module 123 uses the interaction data to determine a degree of urgency of the interaction. A method 300 implemented by the urgency detection module 123 to determine the urgency of the interaction is described hereafter in relation to FIG. 3. The urgency detection module 123 passes urgency data to a transition effect module 124. The transition effect module 124 executes to select an appropriate transition effect for the augmented reality module 125 to apply to the augmented reality content obscuring interaction between the person and the user and provides information regarding the selected transition effect to the module 125 for application to the augmented content.

Figure 2:
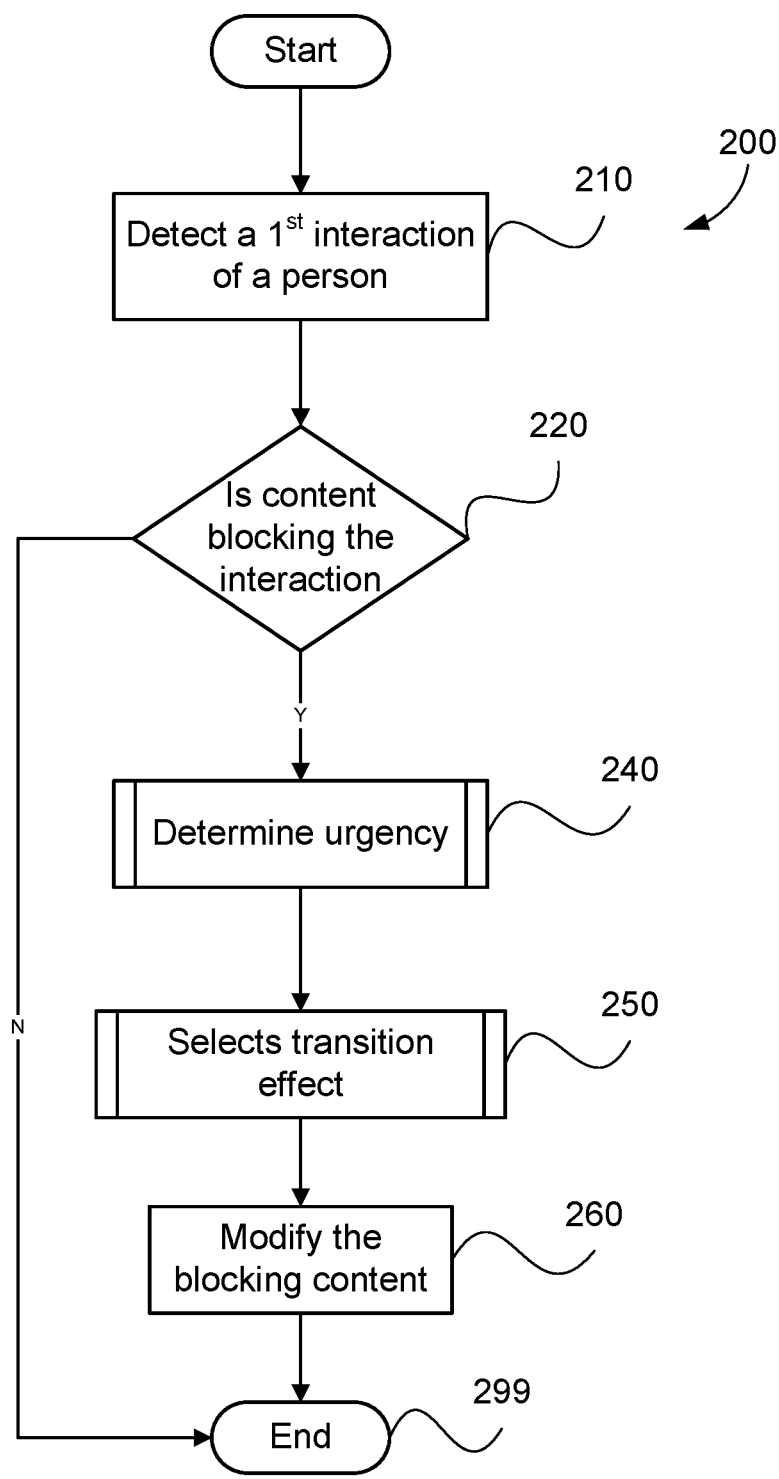
FIG. 2 shows a schematic flow diagram illustrating a method of modifying display of augmented reality content.

FIG. 2 shows a schematic flow diagram of a method 200 of modifying display of augmented reality content. The method 200 is typically a computer-implemented method, implemented as one or more submodules of the application 133, stored in the memory 109 and controlled by execution of the processor 105.

The method 200 starts at a detecting step 210. Execution of the detecting step 210 comprises detecting a first interaction of the user. The step 210 is executed by a sensor detecting an interaction of the person as directed towards the user and accordingly the sensor of the mixed reality system. In the arrangements described the sensor comprises the camera 111 capturing an image of a real world scene (that is of the environment surrounding the user). The application 133 executes to detect if there is a first interaction of the person towards the user present in the captured image. As described above, detection of interaction by the person is implemented by inputting image capture data from the camera 111 to the interaction detection module 122. The interaction is typically directed to the front of the user and accordingly a field of view of the camera 111.

One type of first interaction detected in execution of the detecting step 210 is a gaze interaction. Detection of a gaze interaction is implemented by tracking a person's eye using tracking techniques such as those described in Eye tracking in the Wild by Hansen et al (*Computer Vision and Image Understanding* 2005, 98, pp 155-181). If the person's gaze is detected for a pre-determined threshold of time, the module 122 executes to determine that the person intends to interact with the user of the augmented reality system 100. Another type of first interaction detected in execution of the step 210 is a gesture interaction. The achieved gesture action is detected by recognising a person's gesture using techniques such as that described at HMM based Hand Gesture Recognition: A Review on Techniques and Approaches by Moni et al (2009 2nd IEEE International Conference on Computer Science and Information Technology, August 2009, pp 433-437).

If a gesture is performed by the person and is recognised to be a gesture used for signalling another person, e.g. a wave gesture, the module 122 executes to determine that the person intends to interact with the user of the augmented reality system 100. A further type of first interaction detected by the system 100 is a speech interaction. Detection of a speech interaction is achieved by recognising the person's speech using techniques such as that described at Context-dependent pre-trained deep neural networks for large-vocabulary speech recognition by Dahl et al (Context-Dependent Pre-Trained Deep Neural Networks for Large-Vocabulary Speech Recognition, Audio, Speech, and Language Processing, IEEE Transactions April 2011, 20, pp 30-42). If in execution of the step 210, the module 122 recognises a person saying a relevant keyword, e.g. the user's name, or a relevant sentence, e.g. "excuse me", the application 133 detects that the person intends to interact with the user.

If execution of step 210 detects that the person has made a first interaction, the application 133 executes to retrieve positional data for the augmented reality content from the point of view of the user stored by the augmented reality module 125 For example, the positional data may be stored in the memory 109.

The method 200 then progresses under execution of the processor 105 to a check step 220. In execution of the check step 220, the application 133 executes to determine if the augmented reality content is obscuring the first interaction from the view of the user. In determining if the augmented content is obscuring the view of the user, the application 133 operates to determine if the augmented reality content is positioned between the person and the view of the user. For example, the application 133 executes to determine if the augmented reality content is positioned in an interaction area between the person and the view of the user.

The interaction area relates to an area of the captured image associated with the interaction. In obstructing the interaction area, the augmented content (fully or partially) prevents the user from viewing the environment associated with the interaction area. For example, obscuring the interaction area may comprise blocking, obstructing or occluding the interaction area from the view of the user.

One method of detecting the person is to use a Haar feature-based cascade classifier proposed by Paul Viola and Michael Jones (Rapid Object detection using a Boosted Cascade of Simple Features, Proceedings of the 2001 IEEE Computer Society Conference on Computer Vision and Pattern Recognition CVPR 2001, 2001, 1, pp I-511). Such a method uses a machine learning approach and a classifier can be trained with positive samples of images containing people and negative samples of images not containing people. Using such a trained classifier, the application 133 can execute to detect people or faces of people in camera images. Once application 133 detects the person in the camera image, a bounding box can be constructed encompassing the full body or part of the body of the person, effectively forming the interaction area. For instance, part of the body could be a face or an upper body of the person, or any part of the body of the person detectable by the camera 111 when capturing an image of the environment surrounding the user. Then the application 133 executes to check if the bounding box intersects with the area in a field of view of the user containing augmented reality content. If a non-zero intersection area is detected, i.e. the bounding box intersects with the area, the application 133 determines that the augmented reality content is obscuring the interaction. Instead of using a Haar feature-based cascade classifier, other methods such as Histogram of Gradients for human detection (HOG) may be used to detect people in the scene captured by the camera 111. Further, when determining if the bounding box of a person or part of a person intersects with an augmentation, the obscuring determination may be implemented by comparing the intersection area with a pre-defined threshold. Effectively, the method 200 executes to determine if an element of the augmented content is positioned between the person and a view of the user, such that the person or an interaction area associated with the person is obscured from the view of the user.

If in execution of the check step 220, the content is found not to be obscuring the interaction ("N at step 220), method 200 will continue to step 299. At step 299 the method 200 ends.

If the augmented reality content is determined to be blocking or obscuring the interaction at step 220 (step 220 returns a "Y"), the method 200 progresses under execution of the processor 105 to a determining step 240. Execution of the step 240 determines an urgency of the interaction by the person.

An interaction area is defined in the arrangements described as an area covering the face of the person. In some arrangements, the definition of the interaction area includes any visible portions of the person. In another arrangement, the definition of the interaction area extends to an associated area in relation to the person's face, e.g. the including the area below the face to allow for hand gestures. The method 300 of determining the urgency, as implemented at step 240, is described below in relation to FIG. 3. The step 240 is typically implemented by the urgency detection module 123.

Once the urgency is determined, the method 200 progresses under execution of the processor 105 from the determining step 240 to a selecting step 250. Execution of the selecting step 250 selects a suitable transition effect 250, typically by execution of the transition effect module 124. A method 500 of selecting the transition effect, as implemented at step 250, is described below in relation to FIG. 5.

Once the transition effect is selected, the method 200 progresses under execution of the processor 105 from the selecting step 250 to a modifying step 260. In execution of the modifying step 260, the augmented reality content is modified by execution of the augmented reality module 125. Following the modification of the obscuring content at the step 260, the method 200 ends at step 299.

Although the method 200 above describes detecting an interaction from a single person, in other arrangements the method 200 can be applied to multiple people in view of the camera 111 simultaneously. Such arrangements would apply the method 200 to each of the people detected.

Figure 3:
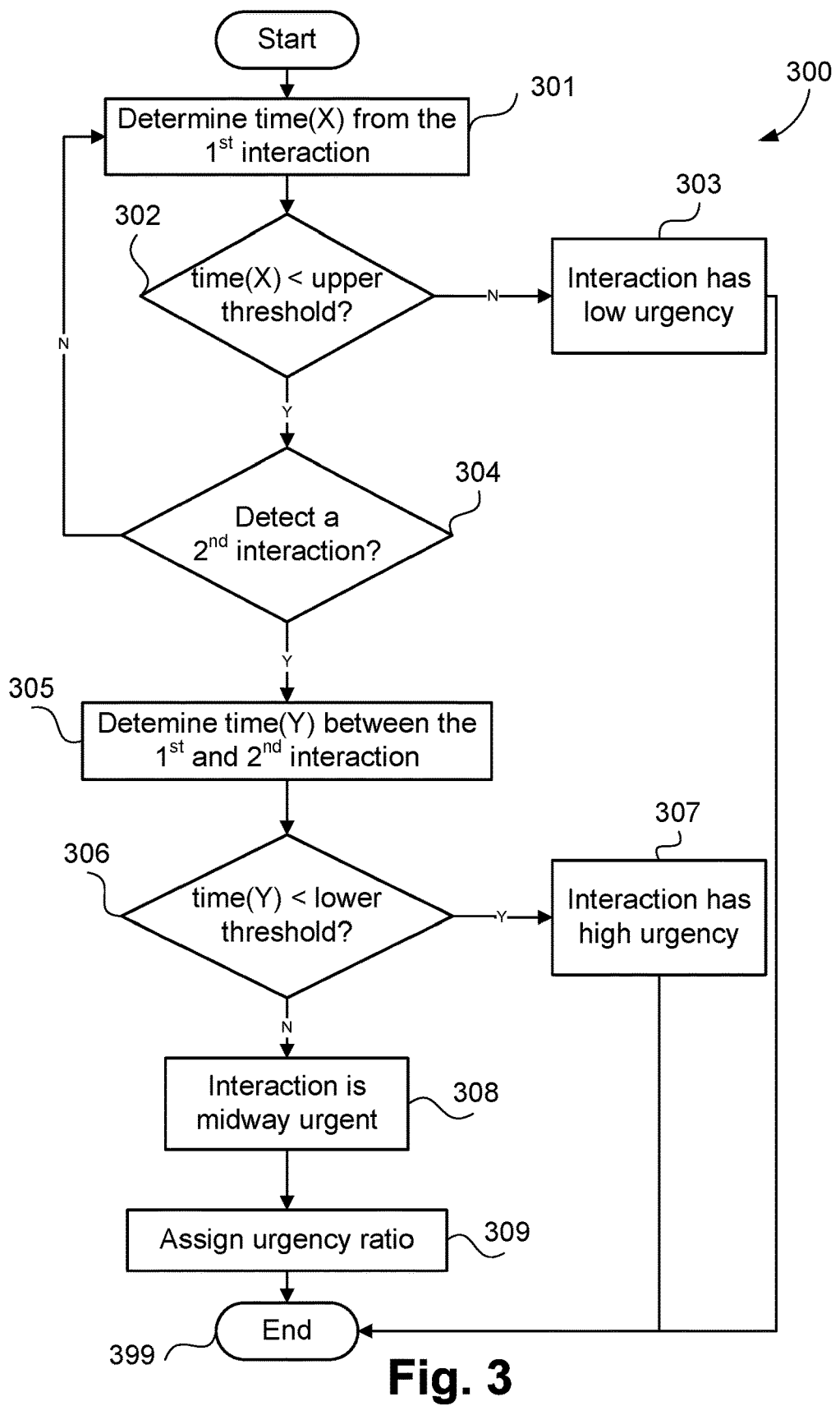
FIG. 3 shows a schematic flow diagram illustrating a method of determining urgency as used in the method of FIG. 2.

FIG. 3 shows a schematic flow diagram of the method 300, as implemented at step 240 of the method 200. The method 300 is typically implemented as one or more sub-modules of the application 133 (in particular by the urgency detection module 123 of the architecture 133a) stored in the memory 109 and controlled by execution of the processor 105. Execution of the method 300 determines the urgency of the interaction detected at step 210.

The method 300 begins at a determining step 301. At the determining step 301, the application 133 executes to determine a time, time(X), from the first interaction (detected at step 210 of the method 200).

The method 300 then proceeds under execution of the processor 105 from the determining step 301 to a determining step 302. Execution of the determining step 301 determines if time(X) is less than an upper threshold or not. The time time(X) is equal to the time since detecting the first interaction at step 210. The upper threshold (or first threshold) may be a predetermined threshold or may be determined based upon a use case or bias, as described below.

If the time time(X) is not less than the upper threshold, that is time(X) is greater than the upper threshold, the check step 302 returns "N" and the method 300 proceeds to determination step 303. The interaction is determined to have low urgency at step 303. Determination of a low urgency at step 303 represents a scenario that the person interacting patiently waits for an inordinate time without performing a second interaction. The application 133 may record the determination that the interaction has a low urgency at step 303. After execution of the step 303, the method 300 ends.

If the application 133 determines the time time(X) to be less than the upper threshold at the step 302, the method 300 progresses under execution of the processor 105 to a check step 304. In execution of step 304, the application 133 executes to determine if a further (second) interaction of the person has been detected. The application 133 detects a second interaction in the same manner as the first interaction is detected at the determining step 210. The types of acceptable interactions that form a second interaction are typically the same as the interactions that constitute a first interaction. However, in some implementations, the second interaction may relate to a non-gaze interaction, or to a non-gaze interaction after a predetermined threshold of time has passed. Accordingly, false detection of interaction due to a person simply looking generally in a direction of the user may be avoided.

If a second interaction is not detected at step 304, the method 300 returns back to the determining step 301 to calculate time(X). The method 300 continues to the check step 302 to check if time(X) is still less than the upper threshold, as described above.

If at step 304 the application 133 detects a second interaction, the application 133 continues to a determination step 305. The application 133 executes to determine a time time(Y) at the determining step 305. The time time(Y) relates to the time from when the first interaction was detected (step 210 of the method 200) to the time the second interaction was detected (step 304 of the method 300).

The method 300 progresses under execution of the processor 105 from the determining step 305 to a check step 306. The application 133 executes to determine if the time time(Y) is less than a lower threshold at the step 306. If the time time(Y) is less than the lower threshold ("Y" at step 306), the method 300 progresses under execution of the processor 105 to a step 307. In execution of the step 307, the interaction is determined to have high urgency. The determination that the interaction has a high urgency may be stored at the step 307. The method 300 proceeds to end after execution of the step 307. The lower threshold (or second threshold) may be a predetermined threshold or may be determined based upon a use case or bias, as described below.

If the time time(Y) is determined not to be less than the lower threshold at the step 306 ("N" at 306), the method 300 progresses under execution of the processor 105 to a step 308. The application 133 determines the interaction to be midway urgent. The application 133 may store the determination that the interaction is midway urgent at the step 308.

The method 300 progresses under execution of the processor 105 from the step 308 to an assigning step 309. Under execution of the processor 105, an urgency ratio is assigned to the interaction at the step 309. A description of how the urgency ratio is defined is described below in relation to FIG. 4. The method 300 ends after execution of the assigning step 309.

In alternative arrangements, the urgency detection method 300 can be event driven rather than time driven. In other words, the method 300 may be driven by detection of the second interaction. For example, if the second interaction is detected after the first interaction within a time which is less than the lower threshold, the urgency is determined to be high. If, however, the second interaction is detected after the first interaction within time which exceeds the lower threshold but below the upper threshold, the interactions are considered as midway urgent, that is of medium urgency. If no second interaction is detected within time defined by the upper threshold, the urgency is determined to be low.

Figure 4:
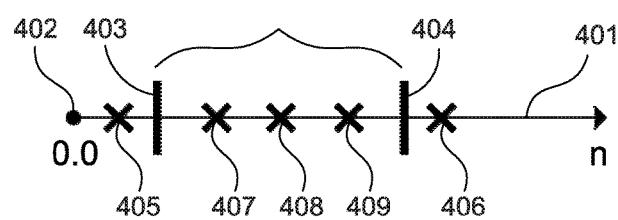
FIG. 4 shows an illustration of a timeline.

FIG. 4 shows a graphical illustration of a timeline 401 and a relative position of the lower and upper thresholds on the timeline 401. As described in relation to FIG. 4, the urgency ratio is determined based upon occurrence of the second interaction relative to the upper and lower thresholds.

A position 402 on the timeline 401 indicates the time the first interaction is detected and positions 405, 406, 407, 408, 409 on the timeline 401 show multiple scenarios of different time(Y) values, each representing a time when the second interaction is detected. A marker 403 represents the lower threshold (used at step 302) and a marker 404 represents the upper threshold (used at step 306). In the example of FIG. 4, the lower threshold 403 could be defined to be 0.5 seconds while the upper threshold could be defined to be 1.5 seconds. Although the upper and lower thresholds are defined in FIG. 4, the thresholds parameters could change depending on the environment in some arrangements. For example one arrangement may require a bias towards one transition effect over the other, thus changing the upper and lower threshold values to accomplish the desired bias. One example of such bias is if the augmented content was specifically positioned to align with a real world object. In such an example, little benefit would result in a reposition transition effect as the augmented reality content would lose context and meaning. Accordingly, the augmented content may prefer a bias towards a transparency transition effect.

The position 405 shows an example of high urgency interaction, as time(Y) is determined to be less than the lower threshold. The position 406 shows an example of low urgency as time(Y) is determined to be greater than the upper threshold. The positions 407, 408, and 409 show examples of midway (medium) urgency. The position 408 is at equal distances from the low and upper thresholds, and thus is defined as a midway urgent at an urgency ratio of 50:50 (at step 309). The urgency ratio is assigned at step 309 by the application 133 taking the position of the time(Y) as a percentage of the range from the opposite threshold.

Resultantly, a first number representing transition effect 1 is a percentage of a distance away from the upper threshold, and a second number representing transition effect 2 is a percentage of a distance away from the lower threshold. In the example of the position 408 of FIG. 4, transition effect 1 is transparency and transition effect 2 is moving the augmented content. The final result of interaction corresponding to the position 408 to the user would be the modifying transparency of the augmented content by 50% and moving the content 50% of an intended distance. The position 407 is relatively close to the lower threshold, being at 75% away from the upper threshold and 25% away from the lower threshold, thus defining an interaction as midway urgent at a ratio of 75:25. The result of an interaction at corresponding to the time position 407 to the user would be the occluding content's transparency by a modification of 75% and moving the augmented content 25% of the intended distance. The position 409 is 25% away from the upper threshold and 75% away from the lower threshold, thus relates to an interaction determined as midway urgent at a ratio of 25:75. The result of an interaction corresponding to the temporal position 409 to the viewer would be the occluding content's transparency by a modification factor of 25% and moving the augmented content 75% of the intended distance.

Figure 5:
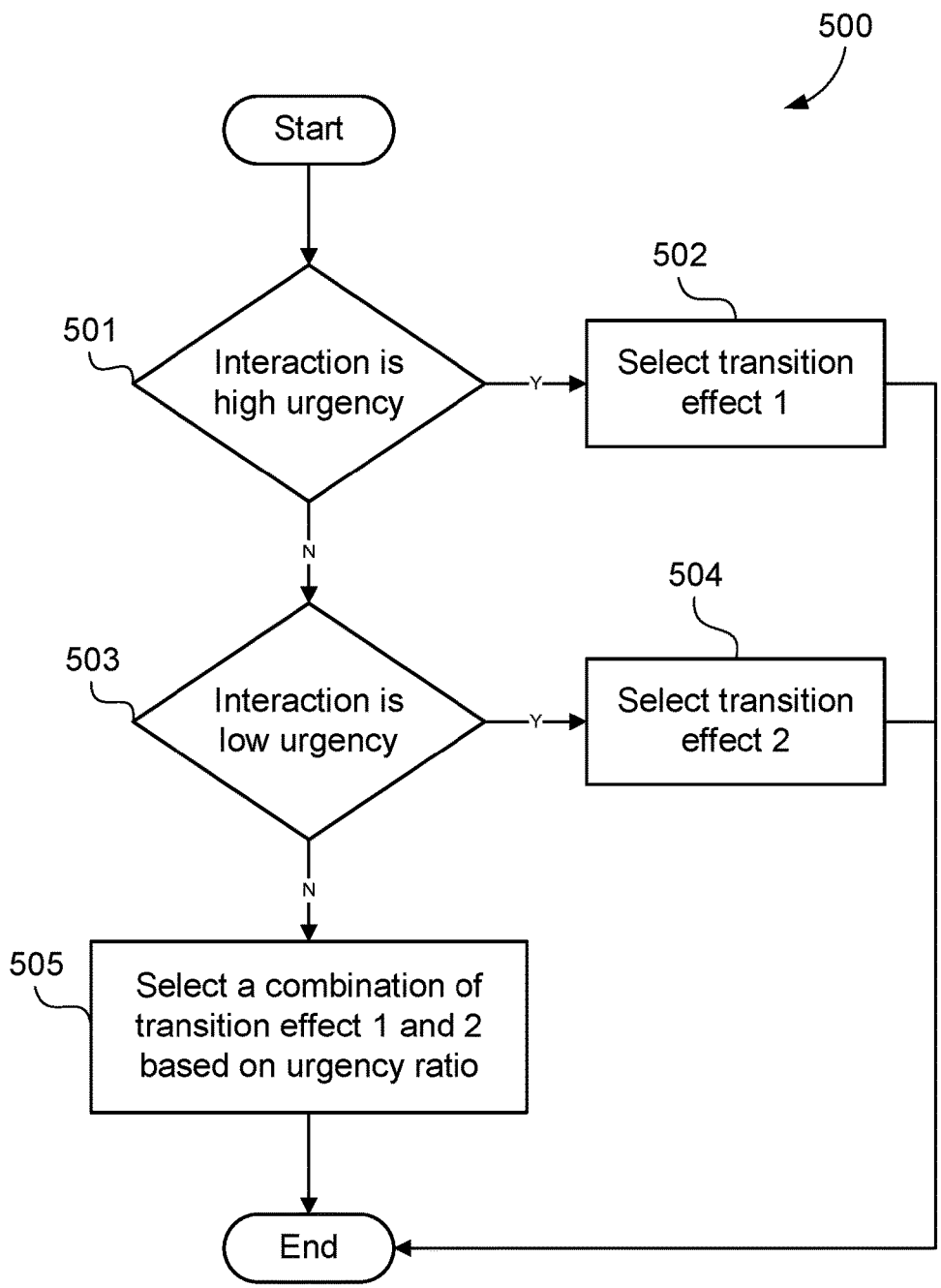
FIG. 5 shows a schematic flow diagram illustrating a method of selecting a transition effect as used in the method of FIG. 2.

FIG. 5 shows a block schematic diagram of the method 500, as implemented at the selecting step 250 of the method 200. The method 500 is implemented by one or more modules of the application 133, as the transition effect module 124 of the architecture 133a, stored in the memory 109 and controlled by execution of the processor 105. The method 500 executes to select the transition effect for the determined urgency.

The method 500 starts at a check step 501. The method 500 begins by receiving the determined urgency output from the method 300 as implemented at step 240 of the method 200. If the determined urgency is high, "Y" at step 501, the method 500 progresses under execution of the processor 105 to a selecting step 502. In execution of the selecting step 502, the application 133 selects transition effect 1 to modify the blocking (obscuring) augmented content. In the arrangements, described, transition effect 1 relates to a modifying transparency of the display of the augmented content.

If the determined urgency is found not to be high at step 501 ("N" at step 501), the method 500 progresses to a check step 503. In execution of the step 503, the application 133 checks if the determined urgency is low.

If the determined urgency is low ("Y" at step 503) the method 500 progresses under execution of the processor 105 to a selecting step 504. In execution of the selecting step 504, the system selects transition effect 2 to modify the blocking augmented content. In the arrangements, described, transition effect 2 relates to a modifying positioning of the display of the augmented content.

If the determined urgency is not low ("N" at check step 503), the method 500 progresses under execution of the processor 105 to a selecting step 505. In execution of the selecting step 505 the interaction is determined to be midway urgent. The selecting step selects to modify the augmented display using a combination of transition effect 1 and transition effect 2, based on the assigned urgency ratio assigned in execution of the step 309.

Upon execution of any one of the selecting steps 502, 504 and 505, the selected modification is passed to the modifying step 260 of the method 200, and the method 500 ends. The transition effect selected in step 502, 504 and 505 is based upon the determined urgency, and accordingly based upon a speed at which visibility of the person, to the user, varies. For example, a transition effect for an urgent interaction may involve changing transparency, which can be implemented quickly so that the user can view the person as soon as possible. In contrast, a low urgency interaction may relate to a transition effect such as an animation repositioning the augmented content. Repositioning the augmented content may require greater processing time in execution of the application 133 compared to changing transparency.

Figure 6A:
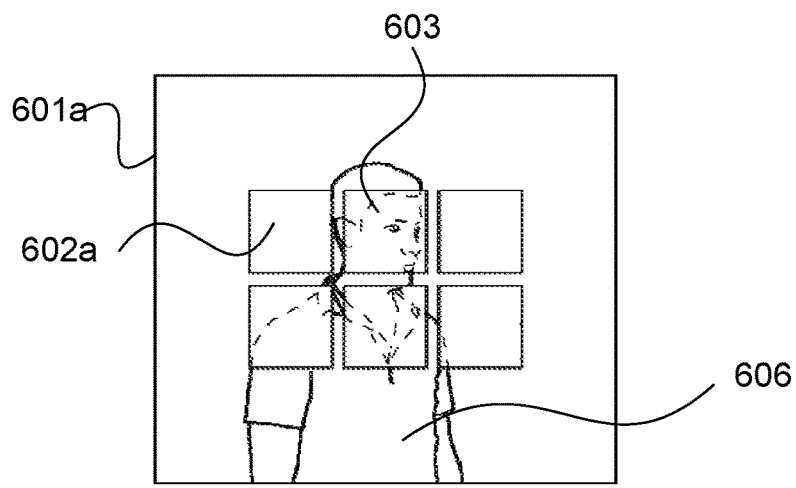
FIGS. 6A, 6B and 6C show scenes captured by a camera according to the arrangements described.
Figure 6B:
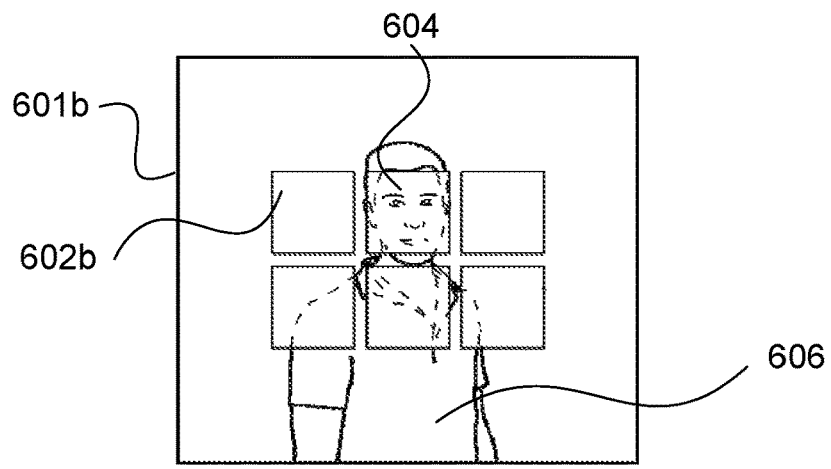
Figure 6C:
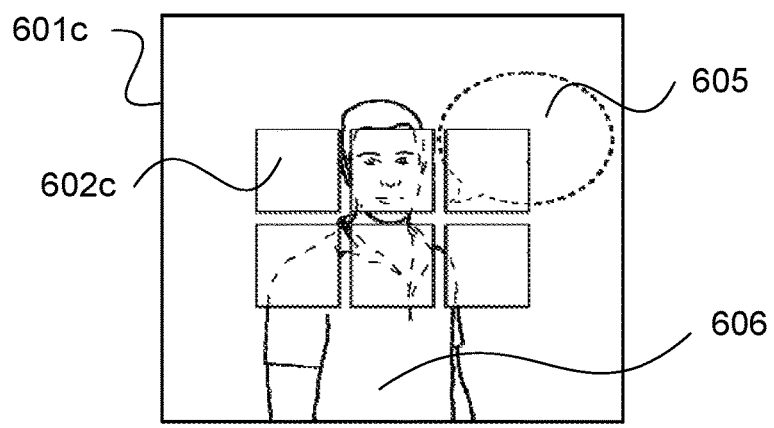

FIGS. 6A, 6B and 6C show a graphical illustration of a series of scenes captured by the camera 111. A scene 601*a* shows a first camera image captured at step 210 of the method 200. Augmented content 602*a* is shown as a reference in FIG. 6A. However, in reality the augmented content 602*a* would not be present in the raw image captured by the camera 111. An area 603 in broken lines in the scene 601*a* illustrates portions of a person 606 being partially obscured by the augmented content 602*a*. FIG. 6A illustrates an example of the person 606 with no intent to communicate. The person 606 is in the scene 601*a* captured by the camera 111. However, the gaze of the person 606 in the scene 601*a* is not towards the user. Accordingly, the application 133 does not detect a first interaction at step 210 of the method 200.

FIG. 6B illustrates a second scene 601*b* captured by the camera 111. The scene 601*b* provides an example where a person 606 has intent to communicate. Augmented content 602*b* is shown as a reference in FIG. 6B, similarly to the augmented content 602*a* of FIG. 6A. An area 604 in broken lines shows the person 606 being partially occluded or obscured by the augmented content 602*b*. The person 606 is in the scene 601*b* and the person has a sustained gaze towards the user. The application 133 detects the sustained gaze as a first interaction by execution of the step 210. In the arrangements described, the first interaction is described as a gaze interaction. In other arrangements, an alternative first interaction could relate to a speech interaction identified using speech detection (detecting the user's name/role/ID) captured via a microphone (not shown) built in to the device 101.

The application 133 progresses from the step 220 to the step 240. In execution of the method 300 at step 240, the application 133 tracks the time since detecting the first interaction and determines at the step 302 if the time is less than the upper threshold. If the time is less than the upper threshold, the application 133 checks for a second interaction at the step 304. If the time is not less than the upper threshold, the application 133 determines that interaction has low urgency at the step 303.

FIG. 6C illustrates an example of the person 606 having a second interaction. FIG. 6C shows a scene 601*c* which occurs some time after the scene 601*b*. Augmented content 602*c* is shown as a reference in FIG. 6C, similarly to the augmented content 602*a* of FIG. 6A. A speech bubble 605 is shown to represent the person 606 speaking to the user. The application 133 detects the speech, represented by the bubble 605, as a second interaction at the step 304. The example of FIG. 6C describes the second interaction as a speech interaction. However, in alternate implementations, the second interaction could be a gesture, for example a wave.

After detecting the first and second interaction, the application determines if the interaction is either of low urgency (step 307) or medium urgency (step 308).

Figure 7A:
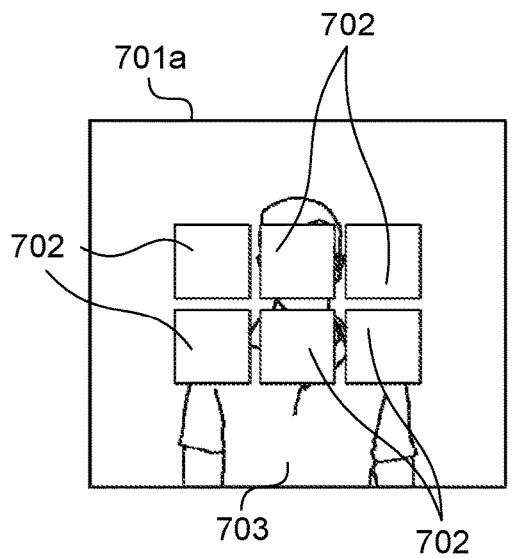
FIGS. 7A to 7D provide show examples of modifying augmented reality content using transition effects according to the arrangements described.

FIGS. 7A to 7D show graphical illustrations of examples of modifying display of augmented reality content using transition effects. A scene 701*a* of FIG. 7A illustrates the user's view through the display 114. The scene 701 includes unmodified augmented content 702. FIG. 7A illustrates a scenario where the content 702 is not modified and the augmented content 702 viewed by the user is blocking a person 703 intending to communicate with the user.

Figure 7B:
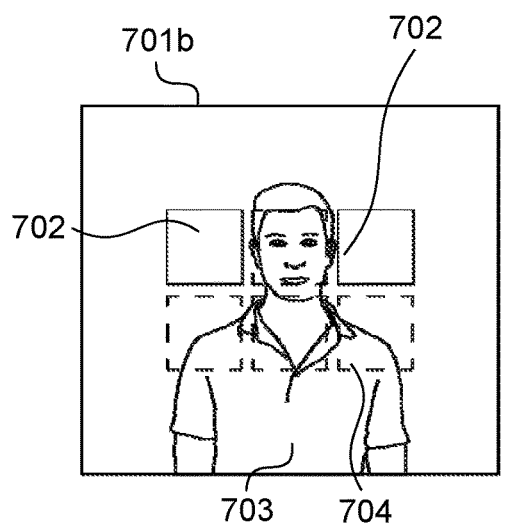

FIG. 7B illustrates an example scene 701*b* where execution of the application has determined an interaction by the person 703 to have high urgency at step 307 and made a corresponding selection at step 501. The application 133 has modified the obscuring content using transition effect 1 at step 502. In the example of FIG. 7A, transition effect 1 is a transparency modification. Accordingly, the augmented reality module 125 modifies the transparency of a portion or element 704 of the blocking or obscuring augmented content 702 to allow the user to see the person. The selection of the element 704 is made because the urgency of interaction dictates that in the scenario of FIG. 7B removing the blocking augmented content as quickly as possible is important. Legibility of the blocking content is determined to be less important.

Figure 7C:
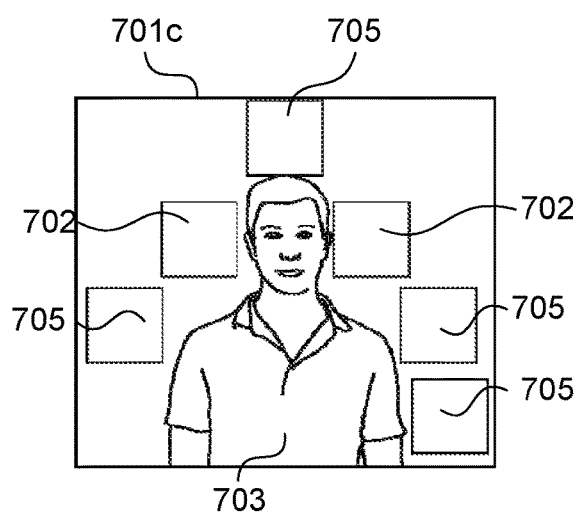

FIG. 7C illustrates an example scene 701*c* where execution of the application 133 has determined an interaction by the person 703 to have low urgency at step 308 and made a corresponding selection at step 503. The application 133 has modified the blocking content using transition effect 2 at step 504. In the example of FIG. 7C, transition effect 2 is a position modification. Accordingly, the augmented reality module 125 modifies the position of elements or portions 705 of the blocking augmented content 702 to allow the user to see the person 703. The selection of the portions 705 is made because the low urgency dictates that in the scenario of FIG. 7C time is not crucial. Such allows the application 133 animation time required to execute to reposition the augmented content without the repositioning being jarring for the augmented reality user.

Figure 7D:
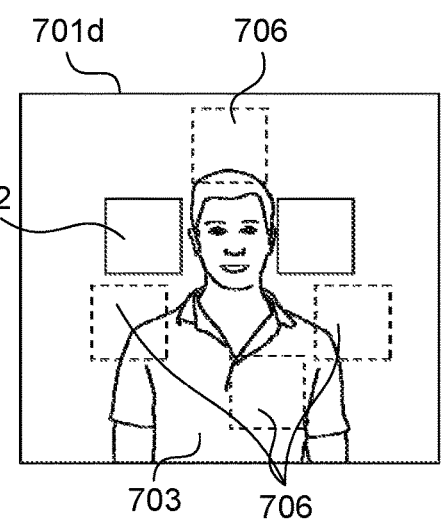

FIG. 7D illustrates an example scene 701*d* where execution of the application 133 has determined an interaction by the person 703 to be midway urgent at step 308 and made a corresponding selection at step 505. The application 133 has modified the blocking content at elements 706 using a combination of transition effect 1 and transition effect 2. In the example of FIG. 7D, transition effect 1 and transition effect 2 are blended according to the assigned urgency ratio determined at step 309 resulting in the modified blocking augmented content portions 706 to be partially transparent and partially moved. In the arrangements described, transition effect 1 is a change of transparency and transition effect 2 is a change in position. In other implementations, other transition effects of the blocking augmented content could be used, such as rotation, scale, modifying the information (to summarize or shorten the information of the augmented content), modifying the colour (to blend with the background) or modifying text characteristics (e.g. font, text size, boldness, and italics).

In arrangements, in addition to those described above, the application 133 is configured to detect the first and second interactions of a first person. However, such arrangements execute to apply the transition effect to multiple people associated with the first person.

In such arrangements, at step 220, the application 133 executes to check if the augmented content is obscuring one or more people associated with the first person, in addition to obscuring the person. Associated with the first person are people who are determined as likely to be part of the interaction. The application 133 determines association of the one or more people with the first person based upon detecting a proximity of each of the one or more people to the first person.

Such arrangements may be particularly useful in scenarios where a single person is acting for a group of people and the determined urgency of the one person is representative of the group. The selected transition effect is not dependant on every person present making a first and second interaction.

In other arrangements, in addition to what is described above, the application 133 is configured to determine the urgency by detecting first and second interactions where the first interaction belongs to a first person and the second interaction belongs to a second person. In such arrangements, if the second person performs a second interaction before the first person performs the second interaction, the selected transition effect is applied to both the first and second person regardless of the determined urgency of the first person. In the arrangement described the first and second interaction are performed by the group of people, instead of being performed by a single person. Alternatively, the first and second interactions may only be performed by a single person and any single interactions from other people in the group will be ignored.

Such arrangements may be particularly in scenarios where multiple people interact on behalf of a group. In such instances, the person who performs the second interaction first is the person determined to relate to the highest urgency, and a primary aim of the application 133 is to remove the occlusion relating to said person.

In detecting interaction of the person, determining an urgency of the interaction, and selecting a transition effect accordingly, the arrangements described can operate to modify display of augmented reality content when determined most likely to be appropriate, that is appropriate to interaction. In selecting the transition effects, the arrangements described may modify the display of the augmented reality content in a manner most appropriate to the determined urgency and minimising disruption to the user for interactions determined to have low urgency.

The arrangements described are applicable to the computer and data processing industries and particularly for the augmented reality and mixed reality industries.

The foregoing describes only some embodiments of the present invention, and modifications and/or changes can be made thereto without departing from the scope and spirit of the invention, the embodiments being illustrative and not restrictive.

The invention claimed is:

1. A system for modifying display of augmented reality content in a mixed reality environment, the system comprising:
   a processor,
   a camera,
   and a memory, the memory having instructions thereon executable by the processor for:
   detecting an interaction between a person and a user of the system, the system displaying the augmented reality content to the user, the interaction being detectable by the system when a gaze interaction of the person is detected as directed towards the user and accordingly the camera;
   determining an urgency of the detected interaction according to further interaction between the person and the user;
   determining that an element of the display of the augmented reality content is obscuring the interaction;
   selecting a transition effect for modifying display of the element from a plurality of transition effects according to the determined urgency of the interaction, and
   modifying the display of the element according to the selected transition effect.

2. The system according to claim 1, wherein the transition effect is selected based on a speed at which a visibility of the person to the user is to be varied.

3. The system according to claim 1, wherein the further interaction between the person and the user of the system is a non-gaze interaction.

4. The system according to claim 1, wherein determining that the element of the display of the augmented reality content is obscuring the interaction comprises determining that the element is positioned in an area between the person and a view of the user.

5. The system according to claim 1, wherein determining that the element of the display of the augmented reality content is obscuring the interaction comprises determining that the element is positioned in an area between the person and a view of the user, and the area relates to a face of the person.

6. The system according to claim 1, wherein determining that the element of the display of the augmented reality content is obscuring the interaction comprises determining that the element is positioned in an area between the person and a view of the user, and the area relates to any portion of a body of the person detectable by the camera.

7. The system according to claim 1, wherein determining that the element of the display of the augmented reality content is obscuring the interaction comprises determining that the element is positioned in an area between the person and a view of the user, and the area relates to a face of the person and an area below the face of the person.

8. The system according to claim 1, wherein determining that the element of the display of the augmented reality content is obscuring the interaction comprises determining that the element is positioned in an area between the person and a view of the user, and the area relates to one or more further persons associated with the person, each of the one or more further persons being associated with the person based upon a proximity to the person.

9. The system according to claim 1, wherein the further interaction which is detected as another interaction between the person and the user of the system comprises one of a gaze interaction, a speech interaction and a gesture interaction.

10. The system according to claim 1, wherein the detected interaction is a first interaction and the first interaction is determined to have a high level of urgency if the further interaction is detected in a time less than a first threshold from the first interaction.

11. The system according to claim 1, wherein the detected interaction is a first interaction and the first interaction is determined to have a high level of urgency if the further interaction is detected in a time less than a first threshold from the first interaction, and the first interaction is determined to have a low level of urgency if the further interaction is detected in a time greater than a second threshold from the first interaction.

12. The system according to claim 1, wherein the detected interaction is a first interaction and the first interaction is determined to have a high level of urgency if the further interaction is detected in a time less than a first threshold from the first interaction, the first interaction is determined to have a low level of urgency if the further interaction is detected in a time greater than a second threshold from the first interaction, and the first interaction is determined to have a medium level of urgency if the further interaction is detected in a time between the first threshold and the second threshold.

13. The system according to claim 1, wherein the selected transition effect relates to modifying transparency of the element if the determined urgency is below a first predetermined threshold.

14. The system according to claim 1, wherein the selected transition effect relates to modifying positioning of the element if the determined urgency is above a second predetermined threshold.

15. The system according to claim 1, wherein the selected transition effect relates to modifying both transparency and positioning of the element if the determined urgency is between first and second thresholds.

16. The system of claim 1 wherein the selected transition effect relates to modifying both transparency and positioning of the element if the determined urgency is between first and second thresholds, and the transparency and the positioning of the element are modified according to a ratio based upon occurrence of the further interaction relative to the first and second thresholds.

17. The system of claim 1, wherein the transition effect comprises at least one of modifying rotation, scaling, information, colour and text characteristics of the element.

18. A mixed reality system, comprising:
a camera,
a processor,
and a memory, the memory having instructions thereon executable by the processor to:
display augmented reality content to a user of the mixed reality system;
detect an interaction between a person and the user, the interaction being detectable by the mixed reality system when a gaze interaction of the person is detected as directed towards the user and accordingly the camera;
determine an urgency of the detected interaction according to further interaction between the person and the user;
determine that an element of the display of the augmented reality content is obscuring the interaction;
select a transition effect for modifying display of the element from a plurality of transition effects according to the determined urgency of the interaction, and
modify the display of the element according to the selected transition effect.

19. A non-transitory computer readable storage medium having a computer program stored thereon, the computer program being executable on a processor to implement a method for modifying display of augmented reality content, comprising:
code for detecting an interaction between a person and a user of a mixed reality system, the mixed reality system displaying the augmented reality content to the user, the interaction being detectable by the mixed reality system when a gaze interaction of the person is detected as directed towards the user and accordingly a camera of the mixed reality system;
code for determining an urgency of the detected interaction according to further interaction between the person and the user, the further interaction being non-gaze interaction;
code for determining that an element of the display of the augmented reality content is obscuring the interaction when the element is positioned between the person and a view of the user;
code for selecting a transition effect for modifying display of the element from a plurality of transition effects according to the determined urgency of the interaction, the selected transition effect being selected based on a speed at which a visibility of the person to the user is varied; and
code for modifying the display of the element according to the selected transition effect.

20. A head mounted device, comprising:
a camera,
a processor,
and a memory, the memory having instructions thereon executable by the processor to:
display a mixed reality environment to a user of the head mounted device, and
modify display of augmented reality content in the mixed reality environment, by:
detecting an interaction between a person and the user of the head mounted device, the interaction being detectable when a gaze interaction of the person is detected as directed towards the user and accordingly the camera;
determining an urgency of the detected interaction according to further interaction between the person and the user, the further interaction being non-gaze interaction;
determining that an element of the display of the augmented reality content is obscuring the interaction when the element is positioned between the person and a view of the user;
selecting a transition effect for modifying the display of the element from a plurality of transition effects according to the determined urgency of the interaction, the selected transition effect being selected based on a speed at which a visibility of the person to the user is varied; and
modifying the display of the element according to the selected transition effect.

21. An apparatus for modifying display of augmented reality content, the apparatus comprising:
a processor,
and a memory, the memory having instructions thereon executable by the processor for:
displaying, using a display device, the augmented reality content to a user viewing both the augmented reality content and actual surrounding environment of the user;
detecting, using a sensor device, an interaction between a person and the user, the interaction being detectable by the apparatus when a gaze interaction of the person is detected as directed towards the user;
determining whether an element of the display of the augmented reality content is obscuring the interaction based on the position of the augmented reality content; and modifying the display of the augmented reality content in case of determining that the element of the display of the augmented reality content is obscuring the interaction.

22. The apparatus according to claim 21, wherein, in the modifying, the display of the element is modified with a transition effect in response to behavior of the person following the gaze interaction.

* * * * *